(12) United States Patent
Iwasaki

(10) Patent No.: US 10,562,993 B2
(45) Date of Patent: *Feb. 18, 2020

(54) POLYMER COMPOSITION AND OPTICAL MATERIAL

(71) Applicant: RICOH COMPANY, LTD., Tokyo (JP)

(72) Inventor: Koji Iwasaki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 68 days.

This patent is subject to a terminal disclaimer.

(21) Appl. No.: 15/908,856

(22) Filed: Mar. 1, 2018

(65) Prior Publication Data

US 2018/0273658 A1 Sep. 27, 2018

(30) Foreign Application Priority Data

Mar. 21, 2017 (JP) ................. 2017-054184

(51) Int. Cl.
| | |
|---|---|
| *C08F 20/56* | (2006.01) |
| *C08F 20/30* | (2006.01) |
| *C08F 26/06* | (2006.01) |
| *C08G 69/00* | (2006.01) |
| *C08K 5/21* | (2006.01) |
| *C08K 5/07* | (2006.01) |
| *C08L 33/26* | (2006.01) |
| *C08L 33/14* | (2006.01) |

(Continued)

(52) U.S. Cl.
CPC ............. *C08F 20/56* (2013.01); *C08F 20/30* (2013.01); *C08F 26/06* (2013.01); *C08G 69/00* (2013.01); *C08K 5/053* (2013.01); *C08K 5/07* (2013.01); *C08K 5/21* (2013.01); *C08L 33/14* (2013.01); *C08L 33/26* (2013.01); *C08L 39/04* (2013.01); *C08L 77/00* (2013.01); *C08L 2201/10* (2013.01); *G02B 1/041* (2013.01); *G02B 1/045* (2013.01)

(58) Field of Classification Search
CPC .......... C08F 20/56; C08F 20/30; C08F 26/06; C08G 69/00; C08K 5/053; C08K 5/07; C08K 5/21; C08L 33/14; C08L 33/26; C08L 39/04; C08L 77/00; C08L 2201/10; G02B 1/041; G02B 1/045
USPC ........................................ 524/211
See application file for complete search history.

(56) References Cited

U.S. PATENT DOCUMENTS

2004/0013972 A1* 1/2004 Nishimura .............. G03F 7/001
430/270.1

FOREIGN PATENT DOCUMENTS

| JP | 5763355 | 6/2015 |
|---|---|---|
| JP | 2016-210955 | 12/2016 |
| WO | WO 2017/047585 A1 | 3/2017 |

OTHER PUBLICATIONS

Hiroto Kudo, et. al. "Synthesis and Refractive-Index Properties of Star-Shaped Polysulfides Radiating from Calixarenes", Macromolecules, 42, (2009), pp. 1051-1057.

* cited by examiner

*Primary Examiner* — William K Cheung
(74) *Attorney, Agent, or Firm* — Oblon, McClelland, Maier & Neustadt, L.L.P.

(57) ABSTRACT

Provided is a polymer composition, wherein the polymer composition has a refractive index difference (B−A) of 0.04 or greater but 0.1 or less between a minimum refractive index A of the polymer composition in a temperature range of 5 degrees C. or higher but lower than 30 degrees C. and (Continued)

a maximum refractive index B of the polymer composition in a temperature range of 30 degrees C. or higher but lower than 50 degrees C.

18 Claims, 3 Drawing Sheets

(51) Int. Cl.
*C08L 39/04* (2006.01)
*C08K 5/053* (2006.01)
*C08L 77/00* (2006.01)
*G02B 1/04* (2006.01)

POLYMER COMPOSITION AND OPTICAL MATERIAL

CROSS-REFERENCE TO RELATED APPLICATIONS

The present application claims priority under 35 U.S.C. § 119 to Japanese Patent Application No. 2017-054184 filed Mar. 21, 2017. The contents of which are incorporated herein by reference in their entirety.

BACKGROUND OF THE INVENTION

Field of the Invention

The present disclosure relates to a polymer composition and an optical material.

Description of the Related Art

In recent years, development of organic materials that respond to external stimuli has progressed. There are known materials of which electric resistance values change in response to temperature changes (for example, see Japanese Patent No. 5763355). With conductive particles dispersed in resins, these materials switch electric resistance by means of volume changes of the resins in response to temperature changes.

There are also been known materials that are intended for application to optical elements (for example, see H. KUDO, et. al. Macromolecules, 42, 1051 (2009)). These materials change molecular structures in response to ultraviolet rays included in the sunlight, and are highly useful because the materials do not need electric energy. These materials can also change molecular refractive indices through ultraviolet-induced isomerization reactions. The world's top-level refractive index drop width of these materials is 0.1. As can be seen, there are known materials that have functions (photo-switchability) of changing, for example, refractive indices in response to external stimuli, and expected uses of these materials are optical materials and light control materials.

SUMMARY OF THE INVENTION

According to one aspect of the present disclosure, a polymer composition has a refractive index difference (B−A) of 0.04 or greater but 0.1 or less. The refractive index difference (B−A) is obtained by subtracting a minimum refractive index A of the polymer composition in a temperature range of 5 degrees C. or higher but lower than 30 degrees C., from a maximum refractive index B of the polymer composition in a temperature range of 30 degrees C. or higher but lower than 50 degrees C.

DESCRIPTION OF THE EMBODIMENTS (Polymer Composition)

Figure 1:
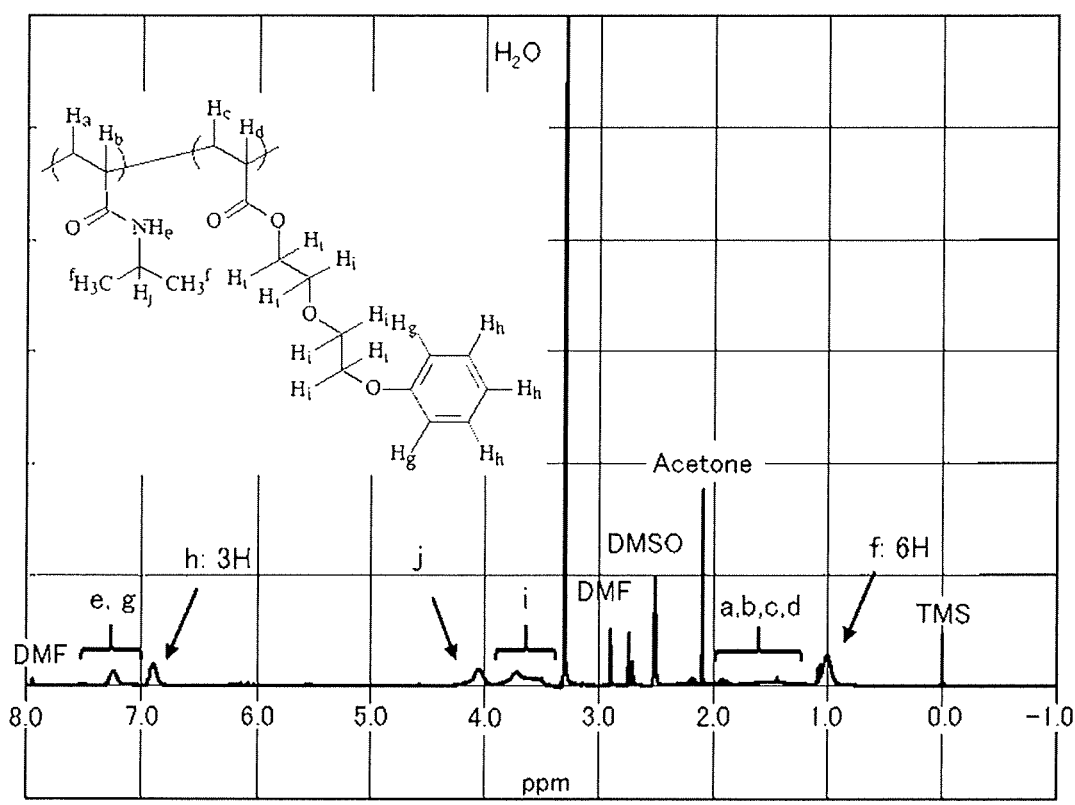
FIG. 1 is a diagram illustrating a nuclear magnetic resonance spectrum of an example of a polymer according to the present disclosure.

A polymer composition of the present disclosure has a refractive index difference (B−A) of 0.04 or greater but 0.1 or less. The refractive index difference is obtained by subtracting a minimum refractive index A of the polymer composition in a temperature range of 5 degrees C. or higher but lower than 30 degrees C., from a maximum refractive index B of the polymer composition in a temperature range of 30 degrees C. or higher but lower than 50 degrees C. The polymer composition preferably contains a polymer, and further contains a third component and other components as needed.

The polymer composition of the present disclosure is based on a finding that with existing materials, development of organic materials that respond to outdoor temperatures has been considerably problematic in terms of possibilities of applications as optical materials such as smart lenses and optical waveguides, and light control materials.

The method for making such materials as described above having photo-switchability express light control functions or optical waveguide control functions is to reduce the densities of the materials to reduce the refractive indices of the materials. Many such organic materials have been known. On the other hand, there have not been known any materials that can be used for smart lenses of which degrees increase in response to temperature rises or color filters of which filtering performances increase in accordance with outdoor temperatures. This is because, as described in Latest technologies of optical organic materials for information and communications (CMC Publishing Co., Ltd., ISBN code: 978-4-88231-683-1), ordinary organic materials undergo a universal, unavoidable phenomenon of being reduced in the densities as a result of activated molecular motions in response to temperature rises. That is, the polymer composition is based on a finding that there have not yet been reported such materials as described above, and the range of application of temperature-responsive photo-switching materials has been limited.

Furthermore, the polymer composition is based on a finding that the materials having photo-switchability have a poor shapability and are difficult to machine. This significantly reduces the industrial applicability of the materials.

The present disclosure has an object to provide a polymer composition excellent in refractive index change repetition durability, high-speed refractive index responsiveness, photo-switchability, shapability, tensile strength, and visible light transmittance.

The present disclosure can provide a polymer composition excellent in refractive index change repetition durability, high-speed refractive index responsiveness, photo-switchability, shapability, tensile strength, and visible light transmittance.

[Refractive Index Difference (B−A)]

The refractive index difference (B−A) is preferably 0.04 or greater but 0.1 or less, and more preferably 0.04 or greater but 0.07 or less. When the refractive index difference (B−A) is 0.04 or greater but 0.1 or less, shapability can be improved.

The minimum refractive index A and the maximum refractive index B can be evaluated with, for example, an Abbe refractometer (apparatus name: DR-M2/1550, available from Atago Co., Ltd.) in the manner described below.

An obtained polymer and an obtained resin composition are molded by hot melt molding to produce a test piece having a width of 10 mm, a thickness of 2 mm, and a length of 20 mm. The test piece is put on the prism of the Abbe refractometer. The refractive indices can be measured with monobromonaphthalene used as an intermediate liquid.

<Polymer>

What matters in the configuration of the molecular structure of the polymer is that the polymer includes temperature-responsive units, of which any one or both of the molecular structure and the polymer chain structure change(s) in accordance with the temperature. With the temperature-responsive units, the polymer can express the function (photo-switchability) of changing, for example, the refractive index in response to the temperature.

Examples of the temperature-responsive units include: units that change structures through heat isomerization, such as azobenzene and diarylethene; hydrogen bond units such as a hydroxyl group, a carbonyl bond, and an amide bond; and any combinations of these units. Among these temperature-responsive units, hydrogen bond units are preferable because hydrogen bond units are excellent in refractive index change repetition durability. Hydrogen bond units that contain an amide bond and have the hydrogen bonding strength between the hydrogen bond units start to decrease at a temperature around 40 degrees C. are more preferable.

The temperature-responsive units are not particularly limited and may be appropriately selected depending on the intended purpose. The temperature-responsive units may be introduced in a straight chain of a polymer, or may be introduced in a branched chain of a branched polymer such as a star-shaped polymer or a hyper branched polymer. There is a tendency that branched polymers have a better responsiveness to heat. This is because branched polymers have lower glass transition temperatures than straight-chain polymers.

The glass transition temperature of the polymer is not particularly limited, may be appropriately selected depending on the intended purpose, and is preferably −15 degrees C. or higher but lower than 140 degrees C., more preferably 0 degrees C. or higher but lower than 140 degrees C., and yet more preferably 0 degrees C. or higher but lower than 50 degrees C. in order for the polymer to express a high-speed refractive index responsiveness. When the glass transition temperature of the polymer is lower than 140 degrees C., the polymer has a high temperature response speed and is suitable for use. When the glass transition temperature of the polymer is 0 degrees C. or higher, the polymer can have an improved shape retainability. The glass transition temperature can be measured with TG-DSC SYSTEM TAS-100 (available from Rigaku Corporation) in the manner described below. First, a sample (about 10 mg) is put in a sample container formed of aluminum. The sample container is put on a holder unit and set in an electric furnace. The sample is heated at a temperature raising rate of 10 degrees C./min from room temperature to 150 degrees C., left to stand at 150 degrees C. for 10 minutes, cooled to room temperature, and left to stand for 10 minutes. Subsequently, the sample is heated at a temperature raising rate of 10 degrees C./min to 150 degrees C. in a nitrogen atmosphere, and a DSC curve is measured with a differential scanning calorimeter (DSC). Based on the obtained DSC curve, an analyzing system in TG-DSC SYSTEM TAS-100 SYSTEM can calculate the glass transition temperature (Tg) from the contact point between a tangent on an endothermic curve at around the glass transition temperature (Tg) and the base line.

The cloud point of the polymer is not particularly limited, may be appropriately selected depending on the intended purpose, and is preferably 10 degrees C. or higher but 75 degrees C. or lower, more preferably 10 degrees C. or higher but 60 degrees C. or lower, yet more preferably 30 degrees C. or higher but lower than 60 degrees C., and particularly preferably 40 degrees C. or higher but lower than 50 degrees C. It is preferable that the polymer have a cloud point, because the polymer has a strong intermolecular interaction and responsiveness to temperature. It is not preferable to use a polymer having a cloud point of lower than 10 degrees C., because such a polymer expresses photo-controllability at a low temperature. When the cloud point of the polymer is 10 degrees C. or higher but 60 degrees C. or lower, photo-controllability can be improved. The cloud point can be measured with, for example, an apparatus named: ULTRA-VIOLET-VISIBLE SPECTROPHOTOMETER ASUV-3100PC (available from As One Corporation) according to JIS K 2269.

It is preferable that the molecular structure of the polymer include an ether bond such as an alkyl ether structure and a phenyl ether structure. With the ether bond, intermolecular interaction acts not only between the temperature-responsive units but also between a temperature-responsive unit and the ether bond, leading to an improved photo-switchability performance. Among ether bonds, an alkyl ether structure is more preferable. This is because an alkyl ether structure has a small steric hindrance and can easily interact with the temperature-responsive units, leading to expression of a higher photo-switchability.

As described above, it is preferable that the hydrogen bond units of the polymer contain an amide bond, and that the ether bond be an alkyl ether structure.

The number average molecular weight (Mn) of the polymer is not particularly limited, may be appropriately selected depending on the intended purpose, and is preferably from 1,000 through 1,000,000.

The weight average molecular weight (Mw) of the polymer is not particularly limited, may be appropriately selected depending on the intended purpose, and is preferably from 1,000 through 1,000,000.

The molecular weight distribution (weight average molecular weight (Mw)/number average molecular weight (Mn)) of the polymer is not particularly limited, may be appropriately selected depending on the intended purpose, and is preferably from 1.0 through 3.0.

The number average molecular weight (Mn), the weight average molecular weight (Mw), and the molecular weight distribution (Mw/Mn) can be measured by, for example, a gel permeation chromatography (GPC) method in the manner described below.

Instrument: HLC-8220 (available from Tosoh Corporation)
Columns: SHODEX ASAHIPAK GF-510 HQ+GF-310×2 (available from Showa Denko K. K.), TSK G2000HXL and G4000HXL (available from Tosoh Corporation)
Temperature: 40 degrees C.
Eluent: 20 mM lithium bromide, and a 20 mM phosphoric acid-containing dimethylformamide solution
Flow rate: 0.5 mL/minute
Detector: HLC-8200 with built-in RI-UV-8220

A sample (1 mL) having a concentration of 0.5% by mass is set in the instrument, and the molecular weight distribution of the polymer is measured under the conditions described above. Based on the measured molecular weight distribution, the number average molecular weight (Mn) and the weight average molecular weight (Mw) of the polymer are calculated, using a molecular weight calibration curve generated based on monodisperse polystyrene standard samples. The molecular weight distribution is a value obtained by dividing Mw by Mn.

The structure of the polymer can be analyzed by a common analyzing method such as nuclear magnetic resonance spectrometry (NMR) and IR.

In the case of nuclear magnetic resonance spectrometry (NMR), the structure of the polymer can be identified in the manner described below.

Instrument: JOEL-ECS-400K (available from JOEL Ltd.)

With the degree of polymerization set to n, the number of hydrogens in each moiety is measured and calculated by magnetic resonance spectrometry ($^1$H-NMR).

The content of the polymer is not particularly limited, may be appropriately selected depending on the intended purpose, and is preferably 50% by mass or greater but less than 100% by mass of the total amount of the polymer composition. When the content of the polymer is 50% by mass or greater, photo-controllability can be improved. When the content of the polymer is less than 100% by mass, shapability can be improved.

[Method for Producing Polymer]

Next, a method for producing the polymer will be described.

The method for producing the polymer is not particularly limited and may be freely selected depending on the structure of the monomer to be used.

Examples of the method for producing the polymer include a method of producing the polymer using a compound represented by Structural formula (1) below and a compound represented by General formula (2) below.

Structural formula (1)

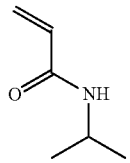

The compound represented by Structural formula (1) may be N-isopropyl acrylamide. However, in the present embodiment, the compound is not limited to N-isopropyl acrylamide. Other examples include hydroxyethyl acrylamide.

General formula (2)

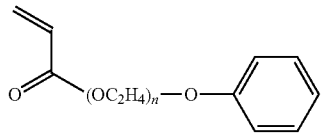

In General formula (2), n is not particularly limited and may be appropriately changed.

Examples of the compound represented by general formula (2) include phenoxypolyethylene glycol acrylate, which is an example in which n=2.

Other examples include 2-acryloyloxyethyl succinate, methoxypolyethylene glycol acrylate, glycol acrylate, phenoxyethyl acrylate, hydroxybutyl acrylate, hydroxyethyl acrylate, and hydroxypropyl acrylate. One of these compounds may be used alone or two or more of these compounds may be used in combination.

Among the compounds represented by Structural formula (1) and the compounds represented by General formula (2), N-isopropyl acrylamide, phenoxypolyethylene glycol acrylate, 2-acryloyloxyethyl succinate, and methoxypolyethylene glycol acrylate are preferable.

An example of the polymer produced using the compound represented by Structural formula (1) and the compound represented by General formula (2) is represented by General formula (3) below as a polymer A.

General formula (3)

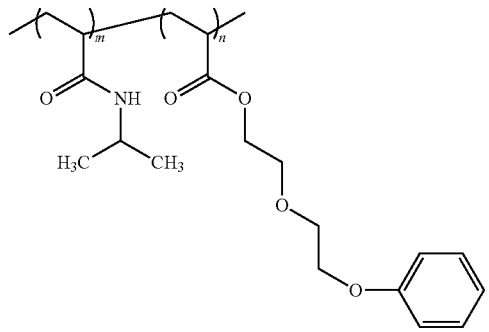

In General formula (3), m and n are not particularly limited and may be appropriately changed.

Next, a specific example of the method for producing the polymer will be described. The method for producing the polymer is not limited to the example described below.

A commercially available product of N-isopropyl acrylamide represented by Structural formula (1) (0.3 mmol) is used as the hydrogen bond unit. A commercially available product of phenoxypolyethylene glycol acrylate represented by General formula (2) (in General formula (2), n=2) (0.3 mmol) is used as the alkyl ether structure. 2,2'-Azobis isobutyronitrile (AIBN) (0.05 mmol) is used as a radical initiator. N,N-dimethylformamide (DMF) (from 3 mL through 20 mL) is used as a polymerization solvent. These materials are subjected to freeze-pump-thaw degassing, then sealed in a tube, stirred at 60 degrees C. for 24 hours, and subjected to production by a radical polymerization method, to obtain a reaction liquid. The obtained reaction liquid is concentrated at a reduced pressure, diluted with chloroform (1.0 mL), and dropped into diethyl ether, to deposit a white precipitate. The deposited precipitate is filtered off and subjected to vacuum drying at 40 degrees C. for 24 hours. In this way, a polymer A can be obtained.

A nuclear magnetic resonance spectrum of the obtained polymer A is illustrated in FIG. 1. FIG. 1 illustrates an example of a result of measurement at 25 degrees C.

By changing the mixing ratio between N-isopropyl acrylamide and phenoxypolyethylene glycol acrylate, it is possible to arbitrarily control the composition of the polymer to be obtained.

The ratio between the structural unit attributable to N-isopropyl acrylamide and the structural unit attributable to phenoxypolyethylene glycol acrylate is preferably from 6:4 through 3:7. When the ratio is from 6:4 through 3:7, a better photo-switchability can be obtained.

<Additive>

The additive is not particularly limited and may be appropriately selected depending on the intended purpose. Examples of the additive include an alcohol compound, a glycerin compound, a urea compound, an aldehyde compound, and water. One of these additives may be used alone or two or more of these additives may be used in combination.

The alcohol compound is not particularly limited and may be appropriately selected depending on the intended purpose. Examples of the alcohol compound include a primary alcohol, a secondary alcohol, and a tertiary alcohol.

Examples of the primary alcohol include straight-chain alkanol, straight-chain alkenol, branched alkanol, and branched alkenol.

Examples of the straight-chain alkanol include methanol, ethanol, 1-propanol, 1-butanol, 1-pentanol, 1-hexanol, 1-heptanol, 1-octanol, 1-nonanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-icosanol, 1-heneicosanol, 1-docosanol, 1-tricosanol, 1-tetracosanol, 1-pentacosanol, 1-hexacosanol, 1-heptacosanol, 1-octacosanol, 1-nonacosanol, and 1-triacosanol.

Examples of the straight-chain alkenol include 1-hexenol, 1-heptenol, 1-octenol, 1-nonenol, 1-decenol, 1-undecenol, 1-dodecenol, 1-tridecenol, 1-tetradecenol, 1-pentadecenol, 1-hexadecenol, 1-pentadecenol, 1-hexadecenol, 1-heptadecenol, 1-octadecenol, 1-nonadecenol, 1-eicenol, 1-docosenol, 1-tetracosenol, 1-pentacosenol, 1-hexacosenol, 1-heptacosenol, 1-heptacosenol, 1-octacosenol, 1-nonacosenol, and 1-tiracosenol.

Examples of the branched alkanol include 2-ethyl hexanol, isodecanol, and isotridecanol.

Examples of the branched alkenol include isohexenol, 2-ethyl hexenol, isotridecenol, isotridecenol, and isooctadecenol.

Examples of the secondary alcohol include 2-propanol, 2-butanol, 2-pentanol, 2-hexanol, and 2-heptanol.

Examples of the tertiary alcohol include 1,1-dimethyl-1-propanol and 1,1-dimethyl-1-butanol.

Examples of the glycerin compound include glycerin, diglycerin, and polyglycerin.

Examples of the urea compound include urea, N,N'-dimethyl propylene urea, p-toluene sulfonyl urea, trimethyl urea, tetraethyl urea, tetramethyl urea, 1,1,3-triphenyl urea, tetraphenyl urea, N-benzoyl urea, and methyl isourea.

Examples of the aldehyde compound include formaldehyde, acetaldehyde, propionaldehyde, butanal, pentanal, hexanal, heptanal, octanal, nonanal, decanal, formic acid, acrolein, benzaldehyde, cinnamaldehyde, perillaldehyde, vanillin, and glyoxal.

The water is not particularly limited and may be appropriately selected depending on the intended purpose. Examples of the water include: pure water such as ion-exchanged water, ultrafiltrated water, reverse osmotic water, and distilled water; and ultrapure water.

The content of the additive is not particularly limited, may be appropriately selected depending on the intended purpose, and is preferably 1% by mass or greater but 50% by mass or less and more preferably 10% by mass or greater but 40% by mass or less of the total amount of the polymer composition. When the content of the additive is 1% by mass or greater but 50% by mass or less, compression resistive strength can be improved.

<Third Component>

The third component is not particularly limited and may be appropriately selected depending on the intended purpose. The third component may be freely selected from, for example, carbonate resins such as polycarbonate and polyalkylene carbonate, polyester resins such as polyethylene terephthalate and polybutylene terephthalate, known resins such as polyglycerin stearic acid ester, polyvinyl alcohol, polyacrylonitrile, and polystyrene, and known inorganic materials such as soda-lime glass and quartz glass depending on a desired strength and a desired transparency. One of these third components may be used alone or two or more of these third components may be used in combination. Among these third components, polyglycerin stearic acid ester is preferable.

<Other Components>

The other components are not particularly limited and may be appropriately selected depending on the intended purpose. Examples of the other components include an antioxidant, a thermal deterioration preventing agent, a plasticizer, an inorganic filler, inorganic particles, a pigment, and a dye.

(Light Control Material, Optical Waveguide Material, Athermal Optical Element, Color Display Element, and Optical Material)

The light control material contains the polymer composition of the present disclosure and further contains other components as needed.

The optical waveguide material contains the polymer composition of the present disclosure and further contains other components as needed.

The athermal optical element contains the polymer composition of the present disclosure and further contains other components as needed.

The color display element contains the polymer composition of the present disclosure and further contains other components as needed.

The optical material of the present disclosure contains the polymer composition of the present disclosure and further contains other components as needed.

The polymer composition of the present disclosure can be suitably used for the light control material, the optical waveguide material, the athermal optical element, the color display element, and the optical material for, for example, a smart lens.

The light control material is not particularly limited and may be appropriately selected depending on the intended purpose. Examples of the light control material include materials for controlling transmittance and reflectance of light, such as an anti-reflection film. The refractive index of the polymer composition of the present disclosure can be controlled in accordance with the outdoor temperature. Hence, the polymer composition can realize light control without consuming an electric energy. Therefore, the polymer composition can be suitably used for this purpose.

The optical waveguide material is not particularly limited and may be appropriately selected depending on the intended purpose. Examples of the optical waveguide material include an inorganic optical waveguide material and an organic optical waveguide material. The polymer composition of the present disclosure has a high transparency, and the refractive index of the polymer composition can be controlled with a thermal energy in a range approximately equivalent to room temperature. Therefore, the polymer composition can realize photo-switching with a simpler mechanism than ever, and hence can be suitably used for this purpose. Furthermore, the polymer composition can easily dissolve in various solvents. Hence, the polymer composition has a wide range of applications, such as use as a coating over an inorganic optical waveguide material.

The athermal optical element is not particularly limited and may be appropriately selected depending on the intended purpose. Examples of the athermal optical element include an organic lens. Refractive indices of existing polymer compositions drop by thermal energy. However, when combined with the polymer composition of the present disclosure, the existing polymer compositions can provide a lens having a substantially non-fluctuating refractive index. Therefore, the polymer composition of the present disclosure can be suitably used for this purpose.

The color display element is not particularly limited and may be appropriately selected depending on the intended purpose. Examples of the color display element include a color filter obtained by combining a high-refractive-index material and a low-refractive-index material. By using the polymer composition of the present disclosure for one of the materials, it is possible to control the wavelength of the light to be filtered, in accordance with the external thermal energy. Combined use of the polymer composition with a temperature control element can realize various kinds of chromatic expressions with a single structure. Therefore, the polymer composition of the present disclosure can be suitably used for this purpose.

The optical material for, for example, a smart lens is not particularly limited and may be appropriately selected depending on the intended purpose. Examples of the optical material include lenses for, for example, cameras and robots, and optical diodes. The polymer composition of the present disclosure can be molded into a lens shape. Therefore, it is possible to produce a smart lens of which focal length or degree can be freely controlled in accordance with external thermal energy. Furthermore, the polymer composition has an extremely wide range of applications in the field of optical materials, because the polymer composition can be coated on existing inorganic lenses to provide a temperature responding function to the lenses.

As described above, the polymer and the resin composition of the present disclosure are novel materials of which refractive indices increase in accordance with rise of the outdoor temperature. With the temperature-responsive photo-switching characteristic taken advantage of, the materials can be suitably used for such applications as light control materials, optical waveguide materials, athermal optical elements, color display elements, and optical materials.

EXAMPLES

The present disclosure will be described below by way of Examples. The present disclosure should not be construed as being limited to these Examples.

Polymers and polymer compositions obtained in Examples and Comparative Examples were analyzed in the manners described below.

<Calculation of Number Average Molecular Weight, Weight Average Molecular Weight, and Molecular Weight Distribution>

The number average molecular weight (Mn), the weight average molecular weight (Mw), and the molecular weight distribution (Mw/Mn) of the polymer were measured by a gel permeation chromatography (GPC) method in the manner described below.

Instrument: HLC-8220 (available from Tosoh Corporation)
Columns: SHODEX ASAHIPAK GF-510 HQ+GF-310×2 (available from Showa Denko K. K.), TSK G2000HXL and G4000HXL (available from Tosoh Corporation)
Temperature: 40 degrees C.
Eluent: 20 mM lithium bromide, and a 20 mM phosphoric acid-containing dimethylformamide solution
Flow rate: 0.5 mL/minute
Detector: HLC-8200 with built-in RI-UV-8220

A sample (1 mL) having a concentration of 0.5% by mass was set in the instrument, and the molecular weight distribution of the polymer was measured under the conditions described above. Based on the measured molecular weight distribution, the number average molecular weight (Mn) and the weight average molecular weight (Mw) of the polymer were calculated, using a molecular weight calibration curve generated based on monodisperse polystyrene standard samples. The molecular weight distribution was a value obtained by dividing Mw by Mn.

<Glass Transition Temperature>

The glass transition temperature (Tg) was measured with TG-DSC SYSTEM TAS-100 (available from Rigaku Corporation) in the manner described below.

First, a sample (about 10 mg) was put in a sample container formed of aluminum. The sample container was put on a holder unit and set in an electric furnace. The sample was heated at a temperature raising rate of 10 degrees C./min from room temperature to 150 degrees C., left to stand at 150 degrees C. for 10 minutes, cooled to room temperature, and left to stand for 10 minutes. Subsequently, the sample was heated at a temperature raising rate of 10 degrees C./min to 150 degrees C. in a nitrogen atmosphere, and a DSC curve was measured with a differential scanning calorimeter (DSC). Based on the obtained DSC curve, the glass transition temperature (Tg) was calculated from the contact point between a tangent on an endothermic curve at around the glass transition temperature (Tg) and the base line, using an analyzing system in TG-DSC SYSTEM TAS-100 SYSTEM.

<Cloud Point>

The cloud point was measured according to JIS K 2269.
Measuring instrument: ULTRAVIOLET-VISIBLE SPECTROPHOTOMETER ASUV-3100PC (available from As One Corporation)

<Nuclear Magnetic Resonance Spectrometry>

An obtained polymer was identified by nuclear magnetic resonance spectrometry in the manner described below.
Instrument: JOEL-ECS-400K (available from JOEL Ltd.)
With the degree of polymerization set to n, the number of hydrogens in each moiety was measured and calculated by magnetic resonance spectrometry ($^1$H-NMR).

<Minimum Refractive Index a and Maximum Refractive Index B>

The minimum refractive index A in the temperature range of 5 degrees C. or higher but lower than 30 degrees C. and the maximum refractive index B in the temperature range of 30 degrees C. or higher but lower than 50 degrees C. were evaluated with, for example, an Abbe refractometer (apparatus name: DR-M2/1550, available from Atago Co., Ltd.) in the manner described below.

An obtained polymer composition was molded by hot melt molding to produce a test piece having a width of 10 mm, a thickness of 2 mm, and a length of 20 mm. The test piece was put on the prism of the Abbe refractometer. The refractive indices were measured with monobromonaphthalene used as an intermediate liquid.

Example 1

N-isopropyl acrylamide (available from Tokyo Chemical Industry Co., Ltd.) (0.3 mmol), azobis isobutyronitrile (AIBN) (0.05 mmol), and N,N-dimethylformamide (DMF) (3.0 mL) were added in a polymerization tube, dissolved, subjected to freeze-pump-thaw degassing, and then sealed in the tube. The polymerization tube was heated to 60 degrees C., to allow the materials to undergo a reaction for 20 hours.

Subsequently, chloroform (1.0 mL) was added to the reaction liquid for dilution. The reaction liquid was dropped into diethyl ether, to deposit a white precipitate. The deposited precipitate was filtered off and subjected to vacuum drying at 40 degrees C. for 24 hours, to obtain a polymer (PNIPAM). Next, urea (available from Tokyo Chemical Industry Co., Ltd.) was added to the obtained polymer such that the content ratio of the polymer would be 60% by mass. The resultant was melted and kneaded, to obtain a polymer composition. The polymer composition was evaluated in various aspects. The composition of the polymer materials is presented in Table 1 below.

Example 2

A polymer composition was obtained in the same manner as in Example 1, except that unlike in Example 1, urea was changed to benzaldehyde (available from Tokyo Chemical Industry Co., Ltd.).

Example 3

A polymer composition was obtained in the same manner as in Example 1, except that unlike in Example 1, urea was changed to glycerin (glycerin compound 1, available from Tokyo Chemical Industry Co., Ltd.).

Example 4

A polymer composition was obtained in the same manner as in Example 1, except that unlike in Example 1, urea was changed to polyglycerin (glycerin compound 2, product name: POLYGLYCERIN #310, available from Sakamoto Yakuhin Kogyo Co., Ltd.).

Example 5

A polymer composition was obtained in the same manner as in Example 1, except that unlike in Example 1, urea was changed to 1,12-dodecanediol (available from Tokyo Chemical Industry, Co., Ltd.), and the melting/kneading was performed such that the content ratio of the polymer would be 95% by mass.

Example 6

N-isopropyl acrylamide (0.05 mmol), phenoxypolyethylene glycol acrylate (available from Shin-Nakamura Chemical Co., Ltd., CAS:56641-05-5) (0.3 mmol), azobis isobutyronitrile (AIBN) (0.05 mmol), and N,N-dimethylformamide (DMF) (3.0 mL) were added in a polymerization tube, dissolved, subjected to freeze-pump-thaw degassing, and then sealed in the tube. The polymerization tube was heated to 60 degrees C., to allow the materials to undergo a reaction for 20 hours. Subsequently, chloroform (1.0 mL) was added to the reaction liquid for dilution. The reaction liquid was dropped into diethyl ether, to deposit a white precipitate. The deposited precipitate was filtered off and subjected to vacuum drying at 40 degrees C. for 24 hours, to obtain a polymer (PNIPAM-PPEA). The obtained polymer was analyzed by magnetic resonance spectrometry. The result was obtained as illustrated in FIG. 1. A hydrogen peak of each moiety was determined as illustrated. Next, ultrapure water (available from Tokyo Chemical Industry Co., Ltd.) was added to the polymer such that the content ratio of the polymer would be 99% by mass. The resultant was melted and kneaded, to obtain a polymer composition. The polymer composition was evaluated in various aspects. The composition of the polymer materials is presented in Table 1 below.

Example 7

A polymer composition was obtained in the same manner as in Example 6, except that unlike in Example 6, the ultrapure water was changed to polyglycerin (glycerin compound 2, product name: POLYGLYCERIN #310, available from Sakamoto Yakuhin Kogyo Co., Ltd.).

Example 8

A polymer composition was obtained in the same manner as in Example 6, except that unlike in Example 6, the ultrapure water was changed to polyglycerin (glycerin compound 2, product name: POLYGLYCERIN #310, available from Sakamoto Yakuhin Kogyo Co., Ltd.), and the melting/kneading was performed such that the content ratio of the polymer would be 50% by mass.

Example 9

A polymer composition was obtained in the same manner as in Example 6, except that unlike in Example 6, the content of N-isopropyl acrylamide was changed from 0.05 mmol to 0.01 mmol, the ultrapure water was changed to 1,12-dodecanediol, and the melting/kneading was performed such that the content ratio of the polymer would be 95% by mass. The composition of the polymer (PNIPAM-PPEA) materials is presented in Table 1 below.

Example 10

A polymer composition was obtained in the same manner as in Example 6, except that unlike in Example 6, the content of N-isopropyl acrylamide was changed from 0.05 mmol to 0.3 mmol, phenoxypolyethylene glycol acrylate was changed to acryloylmorpholine (available from KJ Chemicals Corporation), the ultrapure water was changed to polyglycerin (glycerin compound 2, product name: POLYGLYCERIN #310, available from Sakamoto Yakuhin Kogyo Co., Ltd.), and the melting/kneading was performed such that the content ratio of the polymer would be 95% by mass. The composition of the polymer (PNIPAM-ACMO) materials is presented in Table 1 below.

Example 11

A polymer composition was obtained in the same manner as in Example 7, except that unlike in Example 7, the content ratio of the polymer was changed to 40% by mass.

Example 12

Water-soluble nylon (product name: AQ NYLON P-95, available from Toray Industries, Inc.) was used as a polymer, and melted and mixed with polyethylene glycol (available from Tokyo Chemical Industry Co., Ltd.) such that the content ratio of the polymer would be 50% by mass, to obtain a polymer composition.

Example 13

N-isopropyl acrylamide (0.3 mmol), azobis isobutyronitrile (AIBN) (0.05 mmol), and N,N-dimethylformamide (DMF) (3.0 mL) were added in a polymerization tube, dissolved, subjected to freeze-pump-thaw degassing, and then sealed in the tube. The polymerization tube was heated to 60 degrees C., to allow the materials to undergo a reaction for 20 hours. Subsequently, with the temperature retained, the tube was opened in an argon atmosphere. Phenoxypolyethylene glycol acrylate (available from Shin-Nakamura Chemical Co., Ltd., CAS: 56641-05-5) (0.3 mmol) was added in the tube and the tube was sealed. The materials were allowed to undergo a reaction at 60 degrees C. for 20 hours. Subsequently, chloroform (1.0 mL) was added to the reaction liquid for dilution. The reaction liquid was dropped into diethyl ether, to deposit a white precipitate. The deposited precipitate was filtered off and subjected to vacuum drying at 40 degrees C. for 24 hours, to obtain a polymer (PNIPAM-PPEA). Next, using polyglycerin (product name: POLYGLYCERIN #310, available from Sakamoto Yakuhin Kogyo Co., Ltd.), melting/kneading was performed such that the content ratio of the polymer would be 50% by mass, to obtain a polymer composition The composition of the polymer materials is presented in Table 1 below.

Example 14

A polymer composition was obtained in the same manner as in Example 13, except that unlike in Example 13, the melting/kneading was performed such that the content ratio of the polymer would be 40% by mass.

Comparative Example 1

A polymer composition was obtained in the same manner as in Example 1, except that unlike in Example 1, the content ratio of the polymer was changed to 99.9% by mass.

Comparative Example 2

A polymer composition was obtained in the same manner as in Example 10, except that unlike in Example 10, polyglycerin was changed to urea (available from Tokyo Chemical Industry Co., Ltd.), and the content ratio of the polymer was changed to 99.9% by mass.

Comparative Example 3

A polymer composition was obtained in the same manner as in Comparative Example 2, except that unlike in Comparative Example 2, urea was not used.

Comparative Example 4

A polycarbonate film (PC, available from Sigma-Aldrich Co., LLC, GF91107222) was used as a polymer composition.

Comparative Example 5

A polymer (PNIPAM) was obtained in the same manner as in Example 1. Next, a mixture of N-isopropyl acrylamide and 2,2'-azobis(4-methoxy-2,4-dimethylvaleronitrile) (at a mass ratio (N-isopropyl acrylamide:2,2'-azobis(4-methoxy-2,4-dimethylvaleronitrile)) of 10:1) was added to the obtained polymer such that the content ratio of the polymer would be 60% by mass. The materials were mixed by solution kneading using methanol, and methanol was evaporated from the resultant at a reduced pressure at normal temperature (25 degrees C.). Subsequently, the resultant was left to stand still in an environment having a temperature of 20 degrees C. and a humidity of 80% RH in order to make the resultant absorb moisture such that the content ratio of the polymer would be 50% by mass, to obtain a polymer composition. The polymer composition was evaluated in various aspects. The composition of the polymer materials is presented in Table 1 below.

TABLE 1

|  | Polymer | | | | |
| --- | --- | --- | --- | --- | --- |
|  | PNIPAM | PNIPAM-PPEA | PNIPAM-PPEA | PNIPAM-PPEA | PNIPAM-ACMO |
| N-isopropyl acrylamide (mmol) | 0.30 | 0.05 | 0.01 | 0.30 | 0.30 |
| Phenoxypolyethylene glycol acrylate (mmol) | — | 0.30 | 0.30 | 0.30 | — |
| Phenoxyethyl acrylate (mmol) | — | — | — | — | — |
| Hydroxybutyl acrylate (mmol) | — | — | — | — | — |
| Acryloyl morpholine (mmol) | — | — | — | — | 0.30 |
| Azobis isobutyronitrile (AIBN) (mmol) | 0.05 | 0.05 | 0.05 | 0.05 | 0.05 |
| N,N-dimethyl formamide (DMF) (mL) | 3.00 | 3.00 | 3.00 | 3.00 | 3.00 |

The compositions, polymer physical properties, and "refractive index difference (B−A)" of the polymer compositions of Examples 1 to 14 and Comparative Examples 1 to 5 are presented in Table 2 and Table 3 below.

TABLE 2

|  |  | Polymer composition | | |
| --- | --- | --- | --- | --- |
|  | Kind of polymer | Cloud point of polymer (degree C.) | Content ratio of polymer (% by mass) | Additive (hydrogen bond low-molecular-weight compound) |
| Ex. 1 | PNIPAM | 38.0 | 60.0 | Urea (urea compound) |
| Ex. 2 | PNIPAM | 38.0 | 60.0 | Benzaldehyde (aldehyde compound) |

TABLE 2-continued

| | Kind of polymer | Cloud point of polymer (degree C.) | Content ratio of polymer (% by mass) | Additive (hydrogen bond low-molecular-weight compound) |
|---|---|---|---|---|
| Ex. 3 | PNIPAM | 38.0 | 60.0 | Glycerin (glycerin compound 1) |
| Ex. 4 | PNIPAM | 38.0 | 60.0 | Polyglycerin (glycerin compound 2) |
| Ex. 5 | PNIPAM | 38.0 | 95.0 | 1,12-dodecanediol (alcohol compound) |
| Ex. 6 | PNIPAM-PPEA (Low Tg type) | 15.0 | 99.0 | Ultrapure water |
| Ex. 7 | PNIPAM-PPEA (Low Tg type) | 15.0 | 99.0 | Polyglycerin (glycerin compound 2) |
| Ex. 8 | PNIPAM-PPEA (Low Tg type) | 15.0 | 50.0 | Polyglycerin (glycerin compound 2) |
| Ex. 9 | PNIPAM-PPEA (Super low Tg type) | 15.0 | 95.0 | 1,12-dodecanediol |
| Ex. 10 | PNIPAM-ACMO (High Tg type) | 39.0 | 95.0 | Polyglycerin (glycerin compound 2) |
| Ex. 11 | PNIPAM-PPEA (Low Tg type) | 15.0 | 40.0 | Polyglycerin (glycerin compound 2) |
| Ex. 12 | Water-soluble nylon | 73.0 | 50.0 | Polyethylene glycol (alcohol compound 2) |
| Ex. 13 | PNIPAM-PPEA (Block body) | 5.0 | 50.0 | Polyglycerin (glycerin compound 2) |
| Ex. 14 | PNIPAM-PPEA (Block body) | 5.0 | 40.0 | Polyglycerin (glycerin compound 2) |
| Comp. Ex. 1 | PNIPAM | 38.0 | 99.9 | Urea (urea compound) |
| Comp. Ex. 2 | PNIPAM-ACMO (High Tg type) | 39.0 | 99.9 | Urea (urea compound) |
| Comp. Ex. 3 | PNIPAM-ACMO (High Tg type) | 39.0 | 99.9 | — |
| Comp. Ex. 4 | PC | — | — | — |
| Comp. Ex. 5 | PNIPAM | 38.0 | 50.0 | Mixture of N-isopropyl acrylamide and 2,2'-azobis(4-methoxy-2,4-dimethylvaleronitrile) (mass ratio of 10:1) |

TABLE 3

| | Polymer | | | | | | |
|---|---|---|---|---|---|---|---|
| | Glass transition temperature (degrees C.) | Number average molecular weight (Mn) | Weight average molecular weight (Mw) | Molecular weight distribution (Mw/Mn) | Refractive index A | Refractive index B | Refractive index difference (B − A) |
| Ex. 1 | 134 | 13,100 | 26,200 | 2.000 | 1.4781 | 1.5291 | 0.051 |
| Ex. 2 | 134 | 13,100 | 26,200 | 2.000 | 1.4790 | 1.5290 | 0.050 |
| Ex. 3 | 134 | 13,100 | 26,200 | 2.000 | 1.4759 | 1.5299 | 0.054 |
| Ex. 4 | 134 | 13,100 | 26,200 | 2.000 | 1.4803 | 1.5353 | 0.055 |
| Ex. 5 | 134 | 13,100 | 26,200 | 2.000 | 1.4896 | 1.5416 | 0.052 |
| Ex. 6 | 20 | 10,200 | 26,100 | 2.559 | 1.4879 | 1.5489 | 0.061 |
| Ex. 7 | 20 | 10,200 | 26,100 | 2.559 | 1.4870 | 1.5350 | 0.048 |
| Ex. 8 | 20 | 10,200 | 26,100 | 2.559 | 1.4670 | 1.5120 | 0.045 |
| Ex. 9 | 5 | 13,300 | 39,200 | 2.947 | 1.4970 | 1.5400 | 0.043 |
| Ex. 10 | 142 | 15,300 | 27,200 | 1.778 | 1.5000 | 1.5430 | 0.043 |
| Ex. 11 | 20 | 10,200 | 26,100 | 2.559 | 1.4600 | 1.5050 | 0.045 |
| Ex. 12 | 46 | | | | 1.4750 | 1.5180 | 0.043 |
| Ex. 13 | −15 | 24,500 | 38,400 | 1.567 | 1.4700 | 1.5120 | 0.042 |
| Ex. 14 | −15 | 24,500 | 38,400 | 1.567 | 1.4660 | 1.5070 | 0.041 |
| Comp. Ex. 1 | 134 | 13,100 | 26,200 | 2.000 | 1.4900 | 1.4950 | 0.005 |
| Comp. Ex. 2 | 142 | 15,300 | 27,200 | 1.778 | 1.5110 | 1.5120 | 0.001 |
| Comp. Ex. 3 | 142 | 15,300 | 27,200 | 1.778 | 1.4960 | 1.4910 | −0.005 |
| Comp. Ex. 4 | 150 | | | | 1.5920 | 1.5910 | 0.001 |
| Comp. Ex. 5 | 134 | 13,100 | 26,200 | 2.000 | 1.3802 | 1.5804 | 0.2002 |

The obtained polymer compositions were evaluated in terms of "refractive index change repetition durability", "high-speed refractive index responsiveness", "photo-switchability", "shapability", "tensile strength", and "visible light transmittance" in the manners described below. The results are presented in Tables 4-1 and 4-2 and Table 5 below.

(Refractive Index Change Repetition Durability)

Refractive index change repetition durability of the obtained polymer composition was measured with an Abbe refractometer in the manner described below and evaluated.

Apparatus: DR-M2/1550 (available from Atago Co., Ltd.)

The obtained polymer composition was molded by hot melt molding to produce a test piece having a width of 10 mm, a thickness of 2 mm, and a length of 20 mm. The test piece was put on the prism of the Abbe refractometer. With monobromonaphthalene used as an intermediate liquid, the test piece was heated and cooled repeatedly 100 times, and the minimum refractive index A in the temperature range of 5 degrees C. or higher but lower than 30 degrees C. and the maximum refractive index B in the temperature range of 30 degrees C. or higher but lower than 50 degrees C. were measured, to obtain the difference between the minimum refractive index A and the maximum refractive index B. A ratio between the difference B–A before the repeating test and the difference after the repeating test was calculated, to evaluate "refractive index change repetition durability" according to the evaluation criteria described below.

For example, when the refractive index difference (B–A) before the repeating test is 0.03 and the refractive index difference (B–A) after the test is 0.02, the ratio is obtained according to [(B–A after test)/(B–A before test)]×100=(0.02/0.03)×100=67%.

[Evaluation Criteria]

The value defined above was 70% or higher: 10 points

The value defined above was lower than 70%: 1 point

Note that when the change width between a refractive index at 5 degrees C. and a refractive index at 40 degrees C. is less than 0.01, it is to be judged that there is no refractive index change. In this case, the mark to be given is 0 points.

(High-Speed Refractive Index Responsiveness)

High-speed refractive index responsiveness of the obtained polymer composition was measured with an Abbe refractometer in the manner described below and evaluated.

Apparatus: DR-M2/1550 (available from Atago Co., Ltd.)

The obtained polymer composition was molded by hot melt molding to produce a test piece having a width of 10 mm, a thickness of 2 mm, and a length of 20 mm. Monobromonaphthalene was used as an intermediate liquid.

The test piece was heated at a rate of 1 degree C./minute from 5 degrees C., and the refractive index of the test piece immediately after the stage temperature reached 40 degrees C. was obtained as n0. With the stage temperature kept at 40 degrees C., the refractive indices of the test piece were measured at 10 minute intervals, as n10, n20, n30, . . . , and n10x. Using a value x in the refractive index n10x when a relationship of n10x/n10(x–1)×100≥95 was established, "high-speed refractive index responsiveness" was evaluated according to the evaluation criteria described below.

[Evaluation Criteria]

x was from 1 through 3: 10 points x was from 4 through 5: 9 points x was 6: 8 points x was 7: 7 points x was 8: 6 points x was 9: 5 points x was 10 or greater: 1 point Note that when the change width between a refractive index at 5 degrees C. and a refractive index at 40 degrees C. is less than 0.01, it is to be judged that there is no refractive index change. In this case, the mark to be given is 0 points.

(Photo-Switch Ability)

Photo-switchability of the obtained polymer composition was measured with a spectrophotometer in the manner described below and evaluated.

Apparatus: 1H3LNWWP (available from Horiba, Ltd.)

A sample was spin-coated on a quartz glass, to form a coating film having a thickness of 10 micrometers. Subsequently, the coating film was set in the spectrophotometer such that the coating film was at an angle of 45 degrees with respect to incident light, to measure a transmittance T5 of 400 nm at 5 degrees C. and a transmittance T40 of 400 nm at 40 degrees C. The percentage of the ratio (T40/T5) was calculated, to evaluate "photo-switchability" depending on the temperature of linear light according to the evaluation criteria described below.

[Evaluation Criteria]

The percentage of the ratio (T40/T5) was lower than 60%: 40 points

The percentage of the ratio (T40/T5) was 60% or higher but lower than 70%: 36 points The percentage of the ratio (T40/T5) was 70% or higher but lower than 80%: 32 points The percentage of the ratio (T40/T5) was 80% or higher but lower than 90%: 25 points The percentage of the ratio (T40/T5) was 90% or higher: 1 point (Shapability)

Shapability of the obtained polymer composition was measured in the manner described below and evaluated.

Figure 2A:
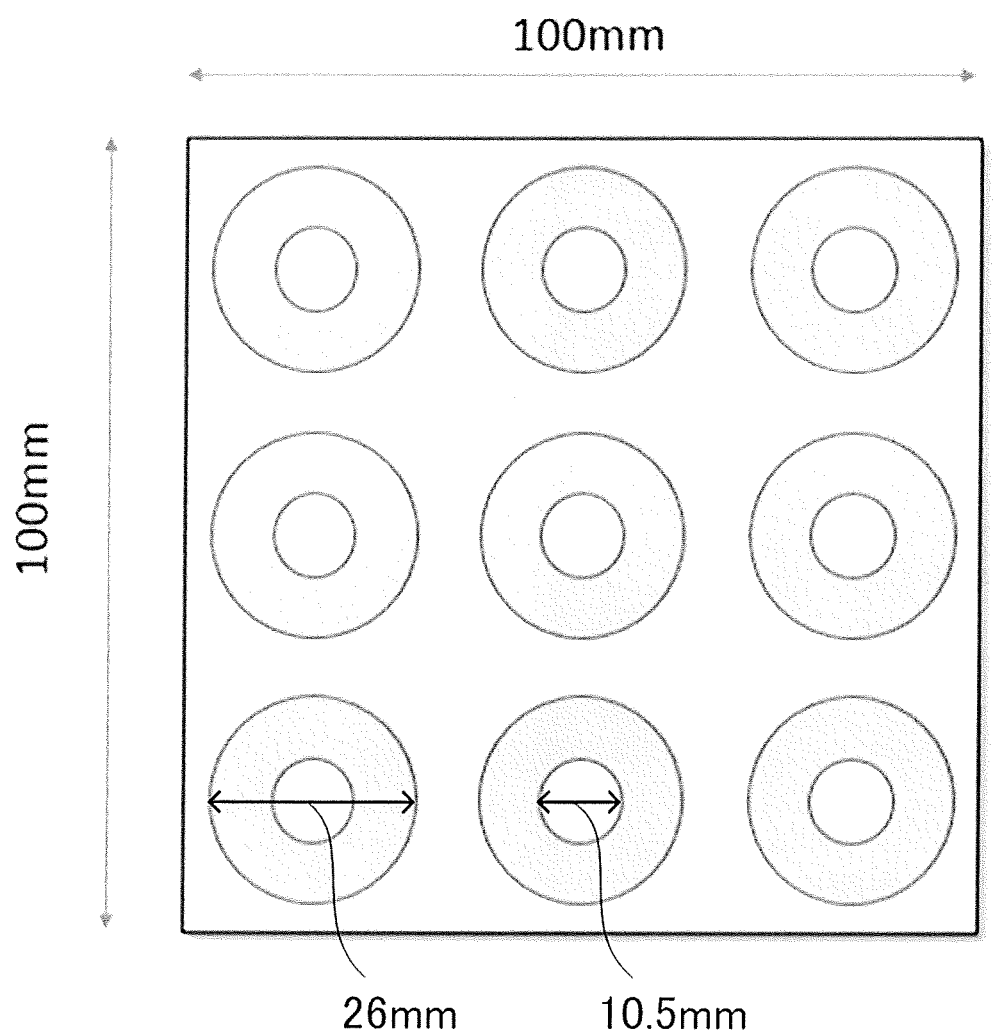
FIG. 2A is an exemplary diagram illustrating an example in which 9 flat washers are arranged in a non-overlapping manner on a sheet obtained by hot melt molding of a polymer composition.
Figure 2B:
FIG. 2B is a side view of FIG. 2A.

The obtained polymer composition was molded by hot melt molding to produce a sheet having a width of 100 mm, a thickness of 5 mm, and a length of 100 mm. As illustrated in FIG. 2A and FIG. 2B, a test sample was obtained by arranging 9 flat washers each having an outer diameter of 26 mm, an inner diameter of 10.5 mm, and a thickness of 2.3 mm in a non-overlapping manner on the sheet as processing points. FIG. 2A is an exemplary diagram illustrating an example in which the 9 flat washers were arranged in a non-overlapping manner on the sheet obtained by molding the polymer composition by hot melt molding. FIG. 2A is an exemplary diagram illustrating an example in which the 9 flat washers were arranged in a non-overlapping manner on the sheet obtained by molding the polymer composition by hot melt molding. FIG. 2B is a side view of FIG. 2A.

Figure 2C:
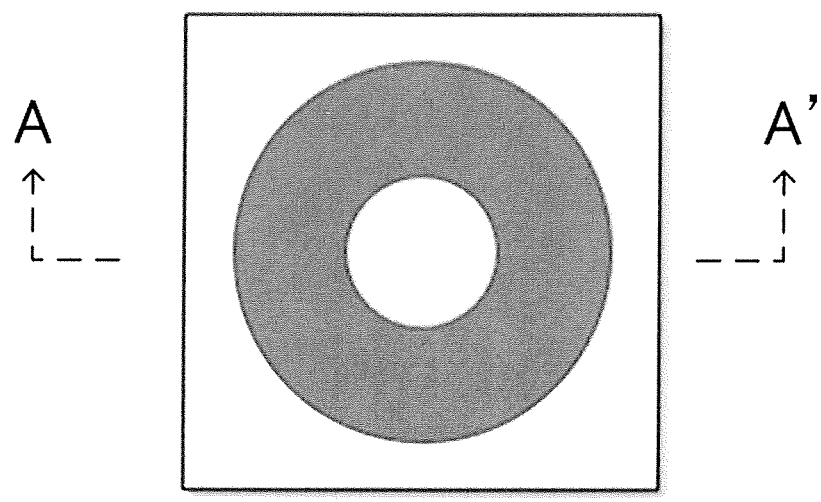
FIG. 2C is an enlarged view of a flat washer in FIG. 2A.
Figure 2D:
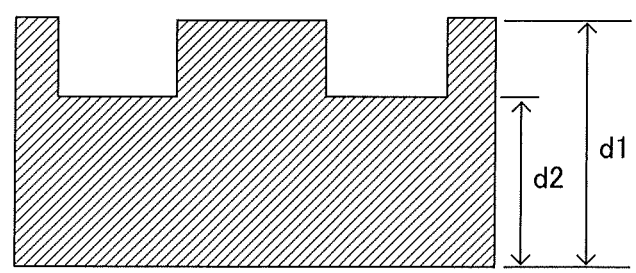
FIG. 2D is a cross-sectional view of FIG. 2C taken along A-A'.

The test sample was pressed with a machine mentioned below under the press conditions presented in Table 4-2 below. Subsequently, the test sample was left to cool to room temperature (25 degrees C.), and the flat washers were removed. As illustrated in FIG. 2C and FIG. 2D, d1 and d2 were measured, to calculate the processing depth at each washer according to the formula below. The thickness was measured with an intermittent thickness meter (instrument name: CONSTANT-PRESSURE THICKNESS GAUGE PG-02J, available from Teclock Corporation). FIG. 2C is an enlarged view of a flat washer in FIG. 2A. FIG. 2D is a cross-sectional view of FIG. 2C taken along A-A'.

One processing depth value was calculated at each processing point, and the average of the processing depths was obtained as the average processing depth of the test sample.

For evaluation of shapability, a value of the average processing depth the closest to 100 was adopted irrespective of the press conditions. "Shapability" was evaluated according to the evaluation criteria described below with a demerit point system for when there was an unmeasurable processing point at which the test sample was broken by the press.
[Evaluation Criteria]
—Average Processing Depth—
The average processing depth was 90% or higher but 100% or lower: 20 points
The average processing depth was 80% or higher but lower than 90%: 18 points
The average processing depth was 70% or higher but lower than 80%: 16 points
The average processing depth was 60% or higher but lower than 70%: 14 points
The average processing depth was 50% or higher but lower than 60%: 12 points
The average processing depth was lower than 50%: 0 points
—Number of Broken Points—
The number of broken, unmeasurable processing points was 1: −1 point
The number of broken, unmeasurable processing points was 2: −2 points
The number of broken, unmeasurable processing points was 3: 3 points
The number of broken, unmeasurable processing points was 4: −5 points
The number of broken, unmeasurable processing points was 5: −7 points
The number of broken, unmeasurable processing points was 6: −9 points
When there were 7 or more broken, unmeasurable processing points, the mark to be given was 0 points regardless of the average processing depth.
Apparatus: available from As One Corporation, a compact hot press AH-10TD
Temperature: 50 degrees C., 100 degrees C., and 150 degrees C.
Pressure: 0.1 t, 0.5 t, and 1.0 t
Time: 5 minutes
Processing depth: (d1−d2)/2.3×100
(Tensile Strength)
Tensile strength of the obtained polymer composition was evaluated with a tensile tester in the manner described below.
Apparatus: AUTOGRAPH AGS J (available from Shimadzu Corporation)
The sample was molded by hot melt molding into a strip shape having a width of 10 mm, a thickness of 25 micrometers, and a length of 150 mm, and the tensile strength of the strip was measured, to evaluate "tensile strength" according to the evaluation criteria described below.
[Evaluation Criteria]
The break strength was 10 N/cm or higher: 10 points
The break strength was 2 N/cm or higher but lower than 10 N/cm: 7 points
The break strength was lower than 2 N/cm: 1 point
(Visible Light Transmittance)
Visible light transmittance of the obtained polymer composition was evaluated with a spectrophotometer in the manner described below.
Apparatus: spectrophotometer V-660DS (available from JASCO Corporation)
The sample was molded by hot melt molding into a strip shape having a thickness of 25 micrometers and a length of 150 mm. The strip was set in the spectrophotometer, to measure transmittance at 40 degrees C. Values of transmittance of 400 nm, 500 nm, 600 nm, and 700 nm were averaged, to evaluate "visible light transmittance" according to the evaluation criteria described below.
[Evaluation Criteria]
90% or higher: 5 points
Lower than 90%: 0 points
(Total Evaluation)
A total mark was obtained by summing up the marks in the evaluations described above (full mark: 95 points), to perform total evaluation according to the evaluation criteria described below. Note that when there was any evaluation result of 0 points, the polymer composition concerned was not suitable for practical use. Therefore, such a polymer composition was evaluated as E irrespective of the mark. A polymer composition evaluated as D or higher was of a practically usable level.
[Evaluation Criteria]
A: 85 points or higher but 95 points or lower
B: 80 points or higher but lower than 85 points
C: 70 points or higher but lower than 80 points
D: 60 points or higher but lower than 70 points
E: Lower than 60 points

TABLE 4-1

| | Evaluation result | | | | | |
|---|---|---|---|---|---|---|
| | Refractive index change repetition durability | | High-speed refractive index responsiveness | | Photo-switchability | |
| | Mark | Actually measured value | Mark | Actually measured value | Mark | Actually measured value |
| Ex. 1 | 10 | 75 | 8 | 6 | 36 | 65 |
| Ex. 2 | 10 | 78 | 9 | 5 | 36 | 68 |
| Ex. 3 | 10 | 77 | 10 | 3 | 36 | 66 |
| Ex. 4 | 10 | 76 | 9 | 4 | 40 | 58 |
| Ex. 5 | 10 | 75 | 8 | 6 | 36 | 69 |
| Ex. 6 | 10 | 84 | 10 | 3 | 40 | 54 |
| Ex. 7 | 10 | 88 | 10 | 2 | 32 | 73 |
| Ex. 8 | 10 | 87 | 10 | 2 | 32 | 76 |
| Ex. 9 | 10 | 85 | 10 | 1 | 25 | 88 |
| Ex. 10 | 10 | 80 | 5 | 9 | 25 | 89 |
| Ex. 11 | 10 | 87 | 7 | 7 | 32 | 75 |
| Ex. 12 | 10 | 71 | 7 | 7 | 25 | 85 |
| Ex. 13 | 10 | 88 | 10 | 1 | 25 | 82 |
| Ex. 14 | 10 | 78 | 10 | 1 | 25 | 80 |
| Comp. Ex. 1 | 0 | 0 | 0 | 0 | 1 | 92 |
| Comp. Ex. 2 | 0 | 0 | 0 | 0 | 1 | 96 |
| Comp. Ex. 3 | 0 | 0 | 0 | 0 | 1 | 91 |
| Comp. Ex. 4 | 0 | 0 | 0 | 0 | 1 | 98 |
| Comp. Ex. 5 | 0 | 0 | 9 | 4 | 40 | 51 |

TABLE 4-2

| | Evaluation result Shapability | | | | | |
|---|---|---|---|---|---|---|
| | Mark | Average processing depth | Average processing depth mark | Number of broken points | Demerit point | Press conditions (temperature, pressure) |
| Ex. 1 | 11 | 75 | 16 | 4 | −5 | 150 degrees C., 1.0 t |
| Ex. 2 | 13 | 78 | 16 | 3 | −3 | 150 degrees C., 1.0 t |
| Ex. 3 | 13 | 79 | 16 | 3 | −3 | 100 degrees C., 1.0 t |
| Ex. 4 | 15 | 80 | 18 | 3 | −3 | 100 degrees C., 1.0 t |

TABLE 4-2-continued

| | Evaluation result Shapability | | | | | |
|---|---|---|---|---|---|---|
| | Mark | Average processing depth | Average processing depth mark | Number of broken points | Demerit point | Press conditions (temperature, pressure) |
| Ex. 5 | 9 | 63 | 14 | 4 | −5 | 150 degrees C., 1.0 t |
| Ex. 6 | 14 | 75 | 16 | 2 | −2 | 100 degrees C., 0.5 t |
| Ex. 7 | 16 | 80 | 18 | 2 | 2 | 100 degrees C., 0.5 t |
| Ex. 8 | 17 | 85 | 18 | 1 | −1 | 100 degrees C., 0.5 t |
| Ex. 9 | 13 | 85 | 18 | 4 | −5 | 50 degrees C., 0.1 t |
| Ex. 10 | 15 | 90 | 20 | 4 | −5 | 150 degrees C., 1.0 t |
| Ex. 11 | 16 | 82 | 18 | 2 | −2 | 100 degrees C., 0.5 t |
| Ex. 12 | 17 | 82 | 18 | 1 | −1 | 150 degrees C., 1.0 t |
| Ex. 13 | 15 | 90 | 20 | 4 | −5 | 50 degrees C., 0.1 t |
| Ex. 14 | 15 | 90 | 20 | 4 | −5 | 50 degrees C., 0.1 t |
| Comp. Ex. 1 | 5 | 65 | 14 | 6 | −9 | 150 degrees C., 1.0 t |
| Comp. Ex. 2 | 7 | 66 | 14 | 5 | −7 | 150 degrees C., 1.0 t |
| Comp. Ex. 3 | 9 | 79 | 16 | 5 | −7 | 150 degrees C., 1.0 t |
| Comp. Ex. 4 | 14 | 65 | 14 | 0 | 0 | 150 degrees C., 1.0 t |
| Comp. Ex. 5 | 11 | 74 | 16 | 4 | −5 | 150 degrees C., 1.0 t |

TABLE 5

| | Evaluation result | | | | | |
|---|---|---|---|---|---|---|
| | Tensile strength (N/cm) | | Visible light transmittance | | Total evaluation | |
| | Mark | Actually measured value | Mark | Actually measured value | Mark | Rank |
| Ex. 1 | 1 | 1.8 | 5 | 95 | 71 | C |
| Ex. 2 | 1 | 1.5 | 5 | 97 | 74 | C |
| Ex. 3 | 1 | 1.4 | 5 | 96 | 75 | C |
| Ex. 4 | 1 | 1.8 | 5 | 96 | 80 | B |
| Ex. 5 | 7 | 2.6 | 5 | 94 | 75 | C |
| Ex. 6 | 7 | 2.9 | 5 | 97 | 86 | A |
| Ex. 7 | 7 | 3.1 | 5 | 95 | 80 | B |
| Ex. 8 | 1 | 1.9 | 5 | 96 | 75 | C |
| Ex. 9 | 7 | 3.3 | 5 | 94 | 70 | C |
| Ex. 10 | 7 | 4.1 | 5 | 92 | 67 | D |
| Ex. 11 | 1 | 1.1 | 5 | 94 | 71 | C |
| Ex. 12 | 7 | 7.8 | 5 | 90 | 71 | C |
| Ex. 13 | 1 | 1.5 | 5 | 96 | 66 | D |
| Ex. 14 | 1 | 1.0 | 5 | 90 | 66 | D |
| Comp. Ex. 1 | 7 | 2.7 | 5 | 97 | 18 | E |
| Comp. Ex. 2 | 7 | 4.4 | 5 | 96 | 20 | E |
| Comp. Ex. 3 | 7 | 4.4 | 5 | 96 | 22 | E |
| Comp. Ex. 4 | 10 | 8.8 | 5 | 98 | 30 | E |
| Comp. Ex. 5 | 1 | 1.7 | 5 | 96 | 66 | E |

The embodiments of the present disclosure are, for example, as follows:
<1> A polymer composition,
wherein the polymer composition has a refractive index difference (B−A) of 0.04 or greater but 0.1 or less between a minimum refractive index A of the polymer composition in a temperature range of 5 degrees C. or higher but lower than 30 degrees C. and a maximum refractive index B of the polymer composition in a temperature range of 30 degrees C. or higher but lower than 50 degrees C.
<2> The polymer composition according to <1>, including at least one additive selected from the group consisting of an alcohol compound, a glycerin compound, a urea compound, an aldehyde compound, and water.
<3> The polymer composition according to <2>,
wherein the glycerin compound is glycerin.
<4> The polymer composition according to any one of <1> to <3>, further including
a polymer having a cloud point of 10 degrees C. or higher but 60 degrees C. or lower.
<5> The polymer composition according to <4>,
wherein a content of the polymer having the cloud point of 10 degrees C. or higher but 60 degrees C. or lower is 50% by mass or greater but less than 100% by mass.
<6> The polymer composition according to <5>,
wherein the cloud point of the polymer is 30 degrees C. or higher but lower than 60 degrees C.
<7> The polymer composition according to <6>,
wherein the cloud point of the polymer is 40 degrees C. or higher but lower than 50 degrees C.
<8> The polymer composition according to any one of <4> to <7>,
wherein the polymer includes a temperature-responsive unit.
<9> The polymer composition according to <8>,
wherein the temperature-responsive unit is at least any one of a unit that changes structures through heat isomerization, and a hydrogen bond unit.
<10> The polymer composition according to any one of <1> to <9>, further including
a polymer having a glass transition temperature of 0 degrees C. or higher but lower than 140 degrees C.
<11> The polymer composition according to <10>,
wherein the polymer has a number average molecular weight of from 1,000 through 1,000,000.
<12> The polymer composition according to <10> or <11>,
wherein the polymer has a weight average molecular weight of from 1,000 through 1,000,000.
<13> The polymer composition according to any one of <10> to <12>,
wherein a molecular weight distribution (weight average molecular weight/number average molecular weight) of the polymer is from 1.0 through 3.0.
<14> The polymer composition according to any one of <10> to <13>,
wherein a content of the polymer is 50% by mass or greater but lower than 100% by mass.
<15> The polymer composition according to any one of <1> to <14>, further including
a carbonate resin.
<16> An optical material including
the polymer composition according to any one of <1> to <15>.
<17> A light control material including
the polymer composition according to any one of <1> to <15>.
<18> An optical waveguide material including
the polymer composition according to any one of <1> to <15>.
<19> An athermal optical element including
the polymer composition according to any one of <1> to <15>.

<20> A color display element including
the polymer composition according to any one of <1> to <15>.

The polymer composition according to any one of <1> to <15>, the optical material according to <16>, the light control material according to <17>, the optical waveguide material according to <18>, the athermal optical element according to <19>, and the color display element according to <20> can solve the various problems in the related art and can achieve the object of the present disclosure.

What is claimed is:

1. A polymer composition,
wherein the polymer composition has a refractive index difference (B−A) of 0.04 or greater but 0.1 or less, the refractive index difference (B−A) being obtained by subtracting a minimum refractive index A of the polymer composition in a temperature range of 5 degrees C. or higher but lower than 30 degrees C., from a maximum refractive index B of the polymer composition in a temperature range of 30 degrees C. or higher but lower than 50 degrees C.

2. The polymer composition according to claim 1, comprising
at least one additive selected from the group consisting of an alcohol compound, a glycerin compound, a urea compound, an aldehyde compound, and water.

3. The polymer composition according to claim 1, comprising
a polymer having a cloud point of 10 degrees C. or higher but 60 degrees C. or lower.

4. The polymer composition according to claim 3,
wherein a content of the polymer is 50% by mass or greater but less than 100% by mass.

5. The polymer composition according to claim 1, comprising
a polymer having a glass transition temperature of 0 degrees C. or higher but lower than 140 degrees C.

6. An optical material comprising
a polymer composition,
wherein the polymer composition has a refractive index difference (B−A) of 0.04 or greater but 0.1 or less, the refractive index difference (B−A) being obtained by subtracting a minimum refractive index A of the polymer composition in a temperature range of 5 degrees C. or higher but lower than 30 degrees C., from a maximum refractive index B of the polymer composition in a temperature range of 30 degrees C. or higher but lower than 50 degrees C.

7. The polymer composition according to claim 2,
wherein the glycerin compound is glycerin.

8. The polymer composition according to claim 2, further comprising
a polymer having a cloud point of 10 degrees C. or higher but 60 degrees C. or lower.

9. The polymer composition according to claim 8,
wherein a content of the polymer is 50% by mass or greater but less than 100% by mass.

10. The polymer composition according to claim 8,
wherein the cloud point of the polymer is 30 degrees C. or higher but 60 degrees C. or lower.

11. The polymer composition according to claim 8,
wherein the cloud point of the polymer is 40 degrees C. or higher but 50 degrees C. or lower.

12. The polymer composition according to claim 8,
wherein the polymer comprises a temperature-responsive unit.

13. The polymer composition according to claim 12,
wherein the temperature-responsive unit is at least one of a unit that changes structures through heat isomerization and a hydrogen bond unit.

14. The polymer composition according to claim 8,
wherein a glass transition temperature of the polymer is 0 degrees C. or higher but lower than 140 degrees C.

15. The polymer composition according to claim 8,
wherein the polymer has a number average molecular weight of from 1,000 through 1,000,000.

16. The polymer composition according to claim 8,
wherein the polymer has a weight average molecular weight of from 1,000 through 1,000,000.

17. The polymer composition according to claim 8,
wherein a molecular weight distribution, which is a ratio of a weight average molecular weight to a number average molecular weight, of the polymer is from 1.0 through 3.0.

18. The polymer composition according to claim 8, further comprising
a carbonate resin.

* * * * *